United States Patent
Lin

(10) Patent No.: US 9,854,113 B1
(45) Date of Patent: Dec. 26, 2017

(54) SUPPORT DEVICE OF CONTACT IMAGE SENSOR OF IMAGE CAPTURE APPARATUS

(71) Applicant: TECO IMAGE SYSTEMS CO., LTD., Taipei (TW)

(72) Inventor: Cheng-Lung Lin, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 0 days.

(21) Appl. No.: 15/370,261

(22) Filed: Dec. 6, 2016

(30) Foreign Application Priority Data

Nov. 11, 2016 (TW) .............................. 105136891 A

(51) Int. Cl.
*H04N 1/00* (2006.01)
*F16M 13/02* (2006.01)
*H04N 1/031* (2006.01)

(52) U.S. Cl.
CPC ........ *H04N 1/00559* (2013.01); *F16M 13/02* (2013.01); *H04N 1/00557* (2013.01); *H04N 1/031* (2013.01)

(58) Field of Classification Search
CPC ........... H04N 1/00559; H04N 1/00519; H04N 1/00554; H04N 1/00557; H04N 1/031; F16M 13/02
USPC ........ 248/274.1, 346.01, 346.03, 316.4, 424, 248/429
See application file for complete search history.

(56) References Cited

U.S. PATENT DOCUMENTS

| | | | | |
|---|---|---|---|---|
| 7,887,051 B2* | 2/2011 | Hirokawa | ............... | B65H 31/02 271/220 |
| 8,854,705 B2* | 10/2014 | Liu | ....................... | H04N 1/1039 358/471 |
| 9,013,733 B2* | 4/2015 | Fujiwara | ................... | B65H 5/00 271/18 |
| 9,253,359 B2* | 2/2016 | Takahashi | .......... | H04N 1/02835 |
| 2007/0030534 A1* | 2/2007 | Ikeno | ................... | H04N 1/1017 358/498 |
| 2016/0242546 A1* | 8/2016 | Vastmans | ............... | G01D 11/30 |

* cited by examiner

*Primary Examiner* — Nkeisha Smith
(74) *Attorney, Agent, or Firm* — Kirton McConkie; Evan R. Witt

(57) ABSTRACT

A support device is applied to support a contact image sensor of an image capture apparatus, which includes a guide rod. The support device includes a slide sleeve and an elastic rod. The slide sleeve, which has a groove, is movably disposed on the guide rod, and a portion of the guide rod is accommodated within the groove. The elastic rod is disposed on the slide sleeve to directly support the contact image sensor. The elastic rod abuts against the contact image sensor, so that the contact image sensor is pushed upwardly, and the contact image sensor is stably kept in the same direction while the slide sleeve is slid on the guide rod. Therefore, the entirety of the support device can achieve the advantages of stably supporting the contact image sensor in balance without using any sliding bracket.

6 Claims, 6 Drawing Sheets

SUPPORT DEVICE OF CONTACT IMAGE SENSOR OF IMAGE CAPTURE APPARATUS

CROSS-REFERENCE TO RELATED APPLICATION

This application claims priority from Taiwan Patent Application No. TW 105136891, filed on Nov. 11, 2016, the entire contents of which are incorporated herein by reference for all purposes.

FIELD OF THE INVENTION

The present invention relates to a support device, and more particularly to a support device applied to support a contact image sensor.

BACKGROUND OF THE INVENTION

In lots type of image capture apparatuses and print apparatuses, the image capture apparatus and the print apparatus configured with a platform-typed contact image sensor are most widely used. A to-be-scan medium or a to-be-print medium is placed on the platform, and a side with the to-be-scan contents is faced to the contact image sensor, so an image may be captured to implement the scan or the print.

In the applications of the image capture apparatus and the print apparatus of prior art, a sliding bracket is usually set to support the contact image sensor. Please refer to FIG. 1, FIG. 2 and FIG. 3. FIG. 1 schematically illustrates the front view of a sliding bracket and a contact image sensor supported by the sliding bracket of prior art. FIG. 2 schematically illustrates the side view of a sliding bracket and a contact image sensor supported by the sliding bracket of prior art. FIG. 3 schematically illustrates the partially structure of an image capture apparatus using a sliding bracket to support a contact image sensor. A sliding bracket 10 of prior art installed on an image capture apparatus is mainly used for supporting a contact image sensor 11. The sliding bracket 10 includes a bracket 12, a spring 13, a guiding rod 14, a bottom base 15 and a sliding sleeve 16. The contact image sensor 11 is disposed on the bracket 12. The bracket 12 is disposed on the guiding rod 14, and the guiding rod 14 is fixed on the bottom base 15. The bottom base 15 is assembled with an upper cover 17 to press a glass 18. Under this circumstance, the contact image sensor 11 is driven to be slid with the sliding sleeve 16, the contact image sensor 11 is forced to abut against the glass 18 by the spring 13, so that a stable contact between the contact image sensor 11 and the glass 18 is maintained during moving.

It is necessary for the sliding bracket 10 to have the bracket 12, so that the contact image sensor can be stably supported. However, the bracket 12 itself has a very heavy volume and weight, and has to be designed for meeting the specification of the contact image sensor 11. Not only the volume and weight of the final product cannot be effectively reduced, but also the manufacturing cost will be increased.

Therefore, there is a need of providing an improved support device distinct from the prior art in order to solve the above drawbacks.

SUMMARY OF THE INVENTION

Some embodiments of the present invention are to provide a support device in order to overcome at least one of the above-mentioned drawbacks encountered by the prior arts.

The present invention provides a support device. By directly disposing the elastic rod on the slide sleeve to support the contact image sensor, the entirety of the support device can achieve the advantages of stably supporting the contact image sensor in balance without using any sliding bracket.

The present invention also provides a support device. Since the elastic rod is disposed on the slide sleeve to directly support the contact image sensor, the contact image sensor is stably kept in the same direction while the slide sleeve is slid on the guide rod, and simultaneously the product volume and weight and the manufacturing cost are effectively reduced.

In accordance with an aspect of the present invention, there is provided a support device. The support device is applied to support a contact image sensor of an image capture apparatus. The image capture apparatus includes a guide rod. The support device includes a slide sleeve and an elastic rod. The slide sleeve has a groove. The slide sleeve is movably disposed on the guide rod, and a portion of the guide rod is accommodated within the groove. The elastic rod is disposed on the slide sleeve to directly support the contact image sensor. The elastic rod abuts against the contact image sensor, so that the contact image sensor is pushed upwardly, and the contact image sensor is stably kept in the same direction while the slide sleeve is slid on the guide rod.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
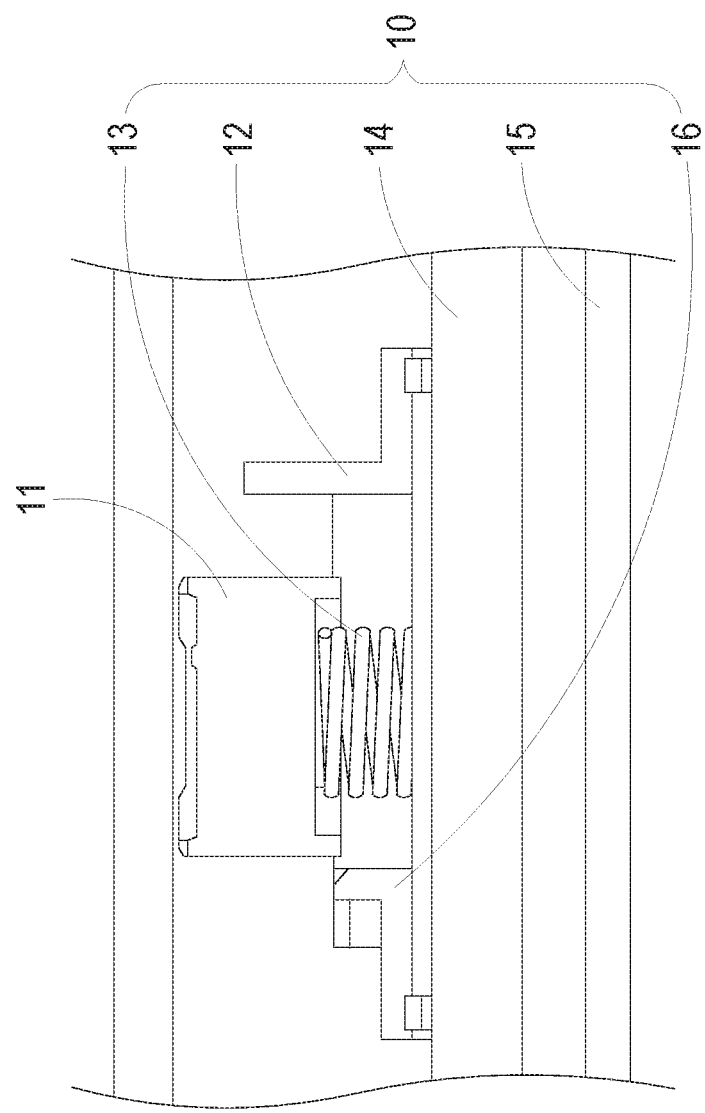
FIG. 1 schematically illustrates the front view of a sliding bracket and a contact image sensor supported by the sliding bracket of prior art.
Figure 2:
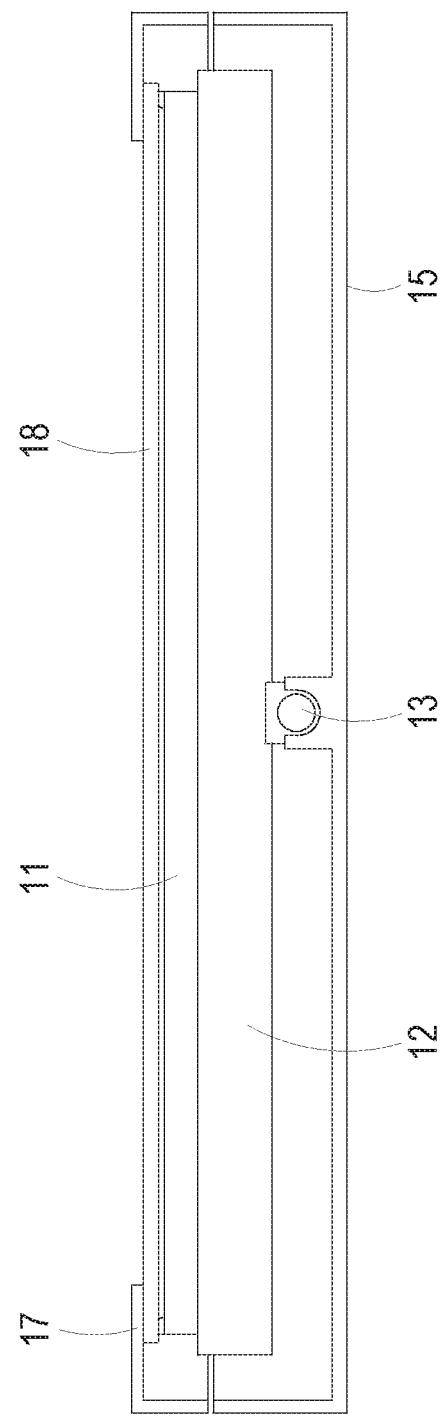
FIG. 2 schematically illustrates the side view of a sliding bracket and a contact image sensor supported by the sliding bracket of prior art.
Figure 3:
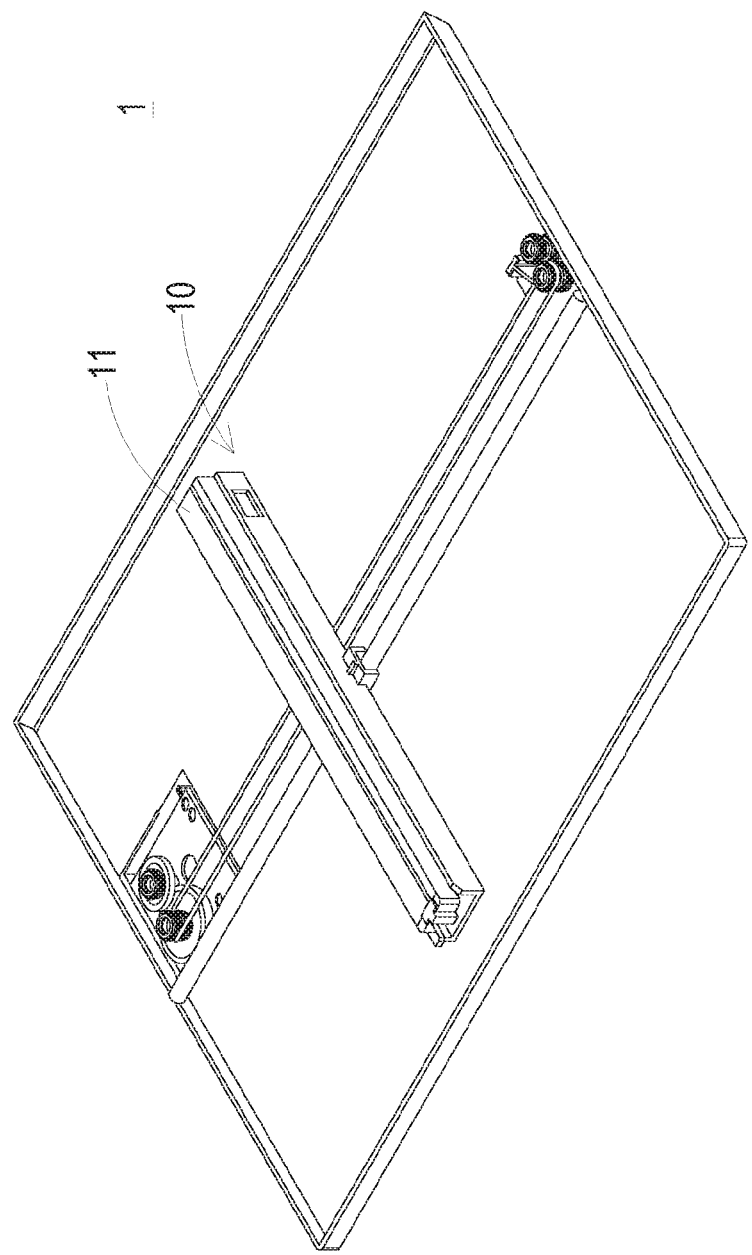
FIG. 3 schematically illustrates the partially structure of an image capture apparatus using a sliding bracket to support a contact image sensor.
Figure 4:
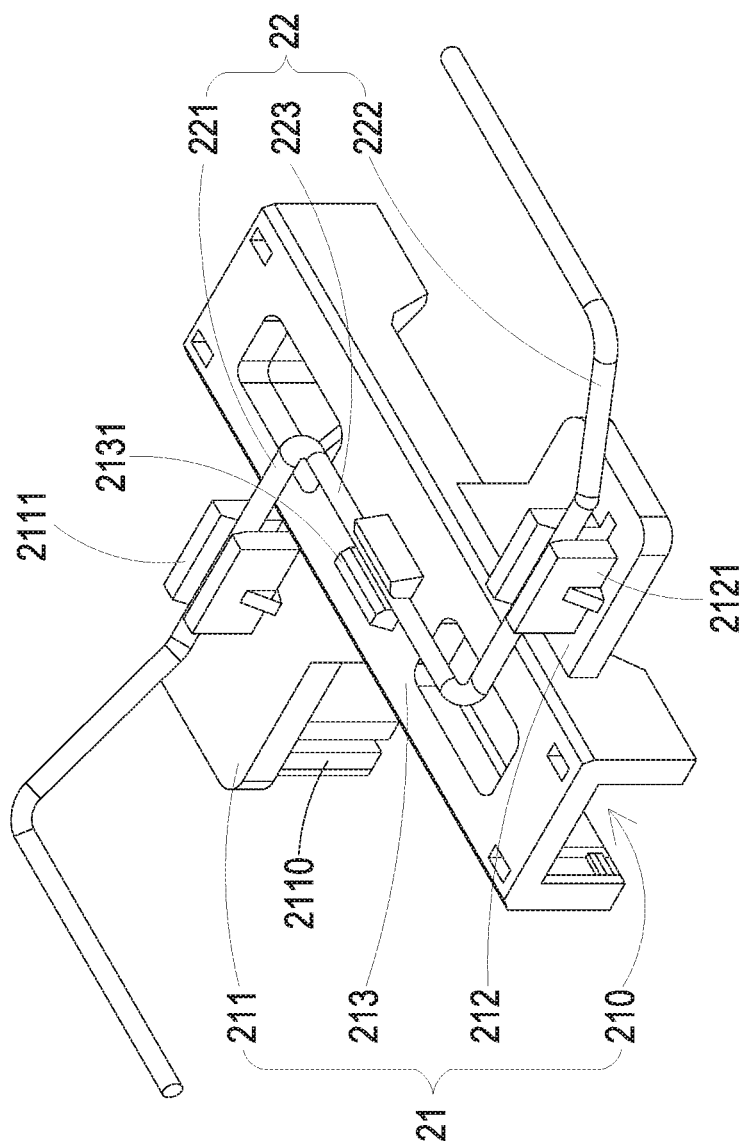
FIG. 4 schematically illustrates the structure of a support device according to an embodiment of the present invention.
Figure 5:
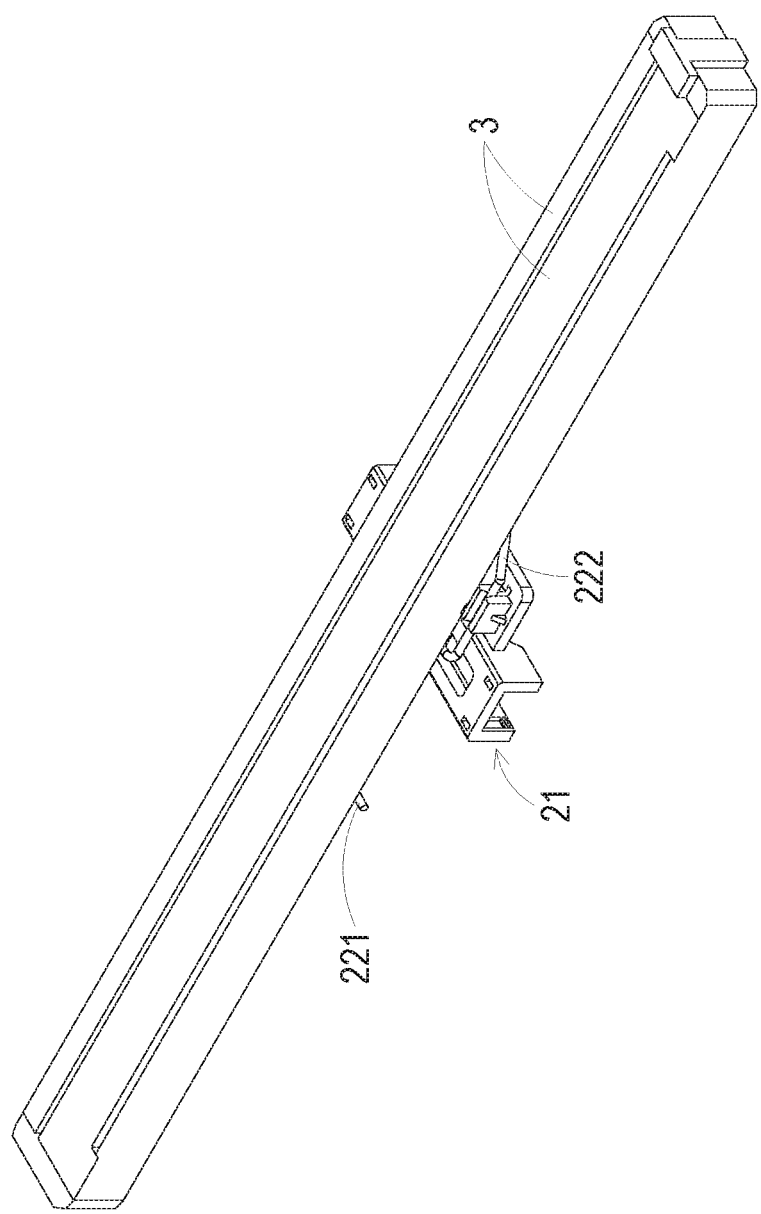
FIG. 5 schematically illustrates the support device and the contact image sensor supported by the support device of the present invention.
Figure 6:
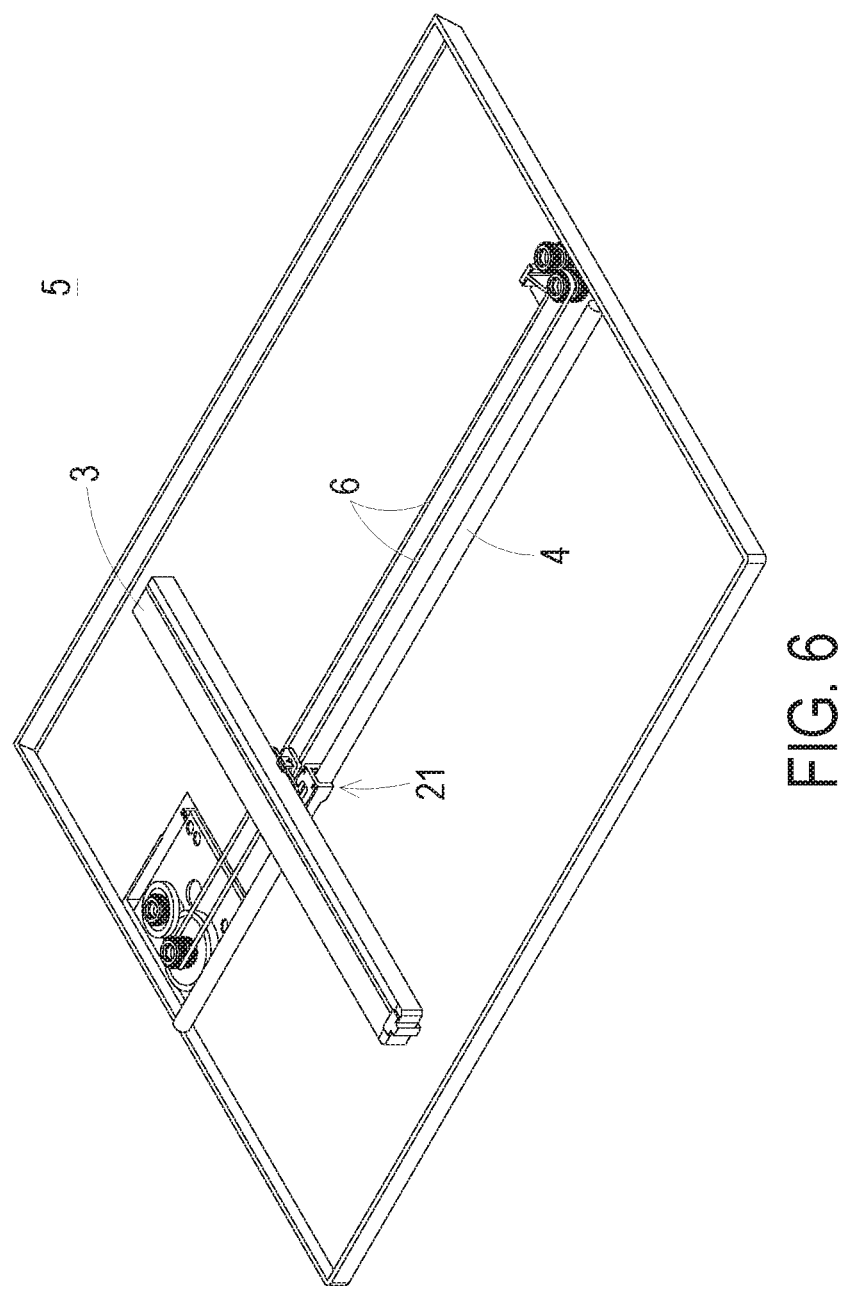
FIG. 6 schematically illustrates the support device installed on a guide rod of an image capture apparatus and the contact image sensor supported by the support device of the present invention.

Please refer to FIG. 4, FIG. 5 and FIG. 6. FIG. 4 schematically illustrates the structure of a support device according to an embodiment of the present invention. FIG. 5 schematically illustrates the support device and the contact image sensor supported by the support device of the present invention. FIG. 6 schematically illustrates the support device installed on a guide rod of an image capture apparatus and the contact image sensor supported by the support device of the present invention. As shown in FIG. 4, FIG. 5 and FIG. 6, a support device 2 of the present invention is mainly applied to support a contact image sensor 3, and is preferred to support the contact image sensor 3 of an image capture apparatus 5. In particular, the image capture apparatus 5 includes a guide rod 4. The support device 2 is preferred to be installed on the guide rod 4, but not limited thereto. The support device 2 includes a slide sleeve 21 and an elastic rod 22. The slide sleeve 21 has a groove 210. The slide sleeve 21 is movably disposed on the guide rod 4, and a portion of the guide rod 4 is accommodated within the groove 210. That is, when the slide sleeve 21 is slid on the guide rod 4, the groove 210 always receives a portion of the guide rod 4. The elastic rod 22 is disposed on the slide sleeve 21 to directly support the contact image sensor 3. The elastic rod 22 abuts against the contact image sensor 3, so that the contact image sensor 3 is forced and then pushed upwardly by the elastic rod 22, and the contact image sensor 3 is stably kept in the same direction while the slide sleeve 21 is slid on the guide rod 4. That is, the stability and the balance of the contact image sensor 3 can be maintained during the movement, especially without tilts and left-and-right shifts.

As mentioned in the above embodiments, the primary feature of the present invention is that in the entirety of the support device 2 of the present invention, none of any bracket and the like is necessary. An elastic rod 22 is directed disposed on a slide sleeve 21 to support the contact image sensor 3. Therefore, the entirety of the support device 2 can achieve the advantages of stably supporting the contact image sensor 3 in balance without using any bracket. Simultaneously, the product volume and weight and the manufacturing cost can be effectively reduced.

In some embodiments, the slide sleeve 21 further has a first extension part 211, a second extension part 212 and a main body 213. The first extension part 211 and the second extension part 212 are respectively extended from two different sides of the main body 213. Moreover, in order to enhance the stability of the structure of the support device 2, the first extension part 211 and the second extension part 212 are point symmetric relative to a point of the main body 213, but not limited herein.

In some embodiments, when the support device 2 is applied to an image capture apparatus 5 utilizing a belt drive system, the slide sleeve 21 further includes a hook 2110 directly formed on the first extension part 211 and connected with a belt 6, such that the slide sleeve 21 and the entirety of the support device 2 are driven by the belt 6.

Some detailed structures of the slide sleeve 21 and the elastic 22 of the support device 2 of the present invention are illustrated as follows. In some embodiments, the slide sleeve 21 further includes a first latch 2111, a second latch 2121 and a third latch 2131. The first latch 2111 is disposed on the first extension part 211, the second latch 2121 is disposed on the second extension part 212, and the third latch 2131 is disposed on the main body 213. The elastic rod 22 has a first rod body 221, a second rod body 222 and a connection rod 223. The first rod body 221 is disposed on the first latch 2111 and the position of the first rod body 221 is limited by the first latch 2111, the second rod body 222 is disposed on the second latch 2121 and the position of the second rod body 222 is limited by the second latch 2121, and the connection rod 223 is disposed on the third latch 2131 and the position of the connection rod 223 is limited by the third latch 2131.

In some embodiments, the first latch 2111, the second latch 2121 and the third latch 2131 may be replaced with, for example, but not limited to, a clip, a penetration through-hole or other position-limiting elements. By respectively disposing the first latch 2111, the second latch 2121 and the third latch 2131 on the first extension part 211, the second extension part 212 and the main body 213, and limiting the positions of the first latch 2111, the second latch 2121 and the third latch 2131, the stress borne on the elastic rod 22 by supporting the contact image sensor 3 can be uniformly distributed to the integral slide sleeve 21 so as to stably maintain the balance of the support device 2 during the movement.

In some embodiments, the portion of the first rod body 221 that is directly contacted with the first latch 2111, is parallel with the portion of the second rod body 222 that is directly contacted with the second latch 2121. Preferably, the portion of the first rod body 221 that is directly contacted with the first latch 2111, is perpendicular to the portion of the connection rod 223 that is directly contacted with the third latch 2131.

Similarly, in order to enhance the stability of the structure of the integral support device 2, the first rod body 221 and a half of the connection rod 223, and the second rod body 222 and the other half of the connection rod 223 are point symmetric relative to a point of the connection rod 223, but not limited herein.

From the above description, the present invention provides a support device. By directly disposing the elastic rod on the slide sleeve to support the contact image sensor, the entirety of the support device can achieve the advantages of stably supporting the contact image sensor in balance without using any sliding bracket. Meanwhile, since the elastic rod is disposed on the slide sleeve to directly support the contact image sensor, the contact image sensor is stably kept in the same direction while the slide sleeve is slid on the guide rod, and simultaneously the product volume and weight and the manufacturing cost are effectively reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A support device of a contact image sensor of an image capture apparatus, comprising:
   a slide sleeve having a groove for accommodating a portion of a guide rod of the image capture apparatus, wherein the slide sleeve further has a first extension part, a second extension part and a main body, and the first extension part and the second extension part are respectively extended from two different sides of the main body, and wherein the slide sleeve further comprises a first latch, a second latch and a third latch, and wherein the first latch is disposed on the first extension part, the second latch is disposed on the second extension part, and the third latch is disposed on the main body; and
   an elastic rod disposed on the slide sleeve to directly support the contact image sensor, wherein the elastic rod abuts against the contact image sensor, the elastic rod has a first rod body, a second rod body and a connection rod, and wherein the first rod body is disposed on the first latch and a position of the first rod body is limited by the first latch, the second rod body is disposed on the second latch and a position of the second rod body is limited by the second latch, and the connection rod is disposed on the third latch and a position of the connection rod is limited by the third latch.

2. The support device of a contact image sensor of an image capture apparatus according to claim 1, wherein the first extension part and the second extension part are point symmetric relative to a point of the main body.

3. The support device of a contact image sensor of an image capture apparatus according to claim 1, wherein the slide sleeve further comprises a hook formed on the first extension part and connected with a belt.

4. The support device of a contact image sensor of an image capture apparatus according to claim 1, wherein a portion of the first rod body directly contacted with the first latch is parallel with a portion of the second rod body directly contacted with the second latch.

5. The support device of a contact image sensor of an image capture apparatus according to claim 1, wherein a portion of the first rod body directly contacted with the first latch is perpendicular to a portion of the connection rod directly contacted with the third latch.

6. The support device of a contact image sensor of an image capture apparatus according to claim 1, wherein the first rod body and a half of the connection rod, and the second rod body and an other half of the connection rod are point symmetric relative to a point of the connection rod.

\* \* \* \* \*